(12) United States Patent
Sharma et al.

(10) Patent No.: US 9,499,434 B1
(45) Date of Patent: Nov. 22, 2016

(54) STRENGTHENING GLASS CONTAINERS

(75) Inventors: Pramod K. Sharma, Ann Arbor, MI (US); Carol A. Click, Corning, NY (US); Kevin Xin Yu, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 1083 days.

(21) Appl. No.: 13/601,287

(22) Filed: Aug. 31, 2012

(51) Int. Cl.
B05D 3/00 (2006.01)
C03C 17/30 (2006.01)

(52) U.S. Cl.
CPC .................................. *C03C 17/30* (2013.01)

(58) Field of Classification Search
CPC ........ C03C 17/00; C03C 17/25; C03C 17/30
See application file for complete search history.

(56) References Cited

U.S. PATENT DOCUMENTS

| | | |
|---|---|---|
| 3,438,801 A | 4/1969 | Schlientz et al. |
| 3,522,075 A | 7/1970 | Kiel |
| 3,743,491 A | 7/1973 | Poole et al. |
| 3,853,673 A | 12/1974 | Levene et al. |
| 3,912,100 A | 10/1975 | Graham et al. |
| 3,998,617 A | 12/1976 | Gliemeroth |
| 4,015,045 A | 3/1977 | Rinehart |
| 4,023,951 A | 5/1977 | Shaw et al. |
| 4,119,760 A | 10/1978 | Rinehart |
| 4,130,407 A | 12/1978 | Ida |
| 4,134,746 A | 1/1979 | Levene et al. |
| 4,206,253 A | 6/1980 | Watanabe |
| 4,290,793 A | 9/1981 | Brockway |
| 4,313,748 A | 2/1982 | Macedo et al. |
| 4,416,930 A | 11/1983 | Kelly |
| 5,078,791 A | 1/1992 | Singh et al. |
| 5,106,561 A | 4/1992 | Singh et al. |
| 5,166,000 A * | 11/1992 | Singh .................. B05B 17/0623 239/102.2 |
| 5,173,365 A | 12/1992 | Singh et al. |
| 5,204,126 A | 4/1993 | Singh et al. |
| 5,219,654 A | 6/1993 | Singh et al. |
| 5,300,561 A | 4/1994 | Singh et al. |
| 5,766,698 A | 6/1998 | Singh et al. |
| 5,897,918 A | 4/1999 | Singh et al. |
| 6,096,394 A | 8/2000 | Jenkner et al. |
| 6,120,908 A | 9/2000 | Papanu et al. |
| 6,143,358 A | 11/2000 | Singh et al. |
| 6,171,652 B1 | 1/2001 | Singh et al. |
| 6,206,191 B1 | 3/2001 | Singh et al. |
| 6,363,749 B1 | 4/2002 | Jenkner et al. |
| 6,451,420 B1 | 9/2002 | Jin et al. |
| 6,472,073 B1 | 10/2002 | Singh et al. |
| 6,607,590 B2 | 8/2003 | Jin et al. |

(Continued)

FOREIGN PATENT DOCUMENTS

| | | |
|---|---|---|
| DE | 10 2006 056 088 A1 | 5/2008 |
| GB | 2 067 178 A | 7/1981 |

(Continued)

*Primary Examiner* — Nathan Empie

(57) ABSTRACT

A glass container and related methods of manufacturing a glass container. A solution having a composition including a silane, a solvent, a catalyst, and water, is applied to an exterior glass surface of the glass container, at an application temperature between 5 and 40 degrees Celsius, such that the solution at least partially fills the surface imperfections to provide a room-temperature-curable cold-end coating on the glass container. Then, the applied solution is allowed to cure on the exterior glass surface of the glass container, at a curing temperature between 5 and 40 degrees Celsius.

18 Claims, 2 Drawing Sheets

(56) References Cited

U.S. PATENT DOCUMENTS

| | | |
|---|---|---|
| 6,610,363 B2 | 8/2003 | Arora et al. |
| 6,890,987 B2 | 5/2005 | Arora et al. |
| 7,415,841 B2 | 8/2008 | Kudoh et al. |
| 7,550,193 B2 | 6/2009 | Hu et al. |
| 7,575,809 B2 | 8/2009 | Glaubitt et al. |
| 2003/0079500 A1 | 5/2003 | Umeyama |
| 2004/0011245 A1 | 1/2004 | Sambasivan et al. |
| 2004/0221615 A1 | 11/2004 | Postupack et al. |
| 2005/0175786 A1 | 8/2005 | Singh et al. |
| 2005/0234187 A1 | 10/2005 | Arora et al. |
| 2007/0238804 A1 | 10/2007 | Ho et al. |
| 2007/0246689 A1 | 10/2007 | Ge et al. |
| 2008/0199618 A1 | 8/2008 | Wen et al. |
| 2009/0064893 A1 | 3/2009 | Sambasivan et al. |
| 2009/0235691 A1 | 9/2009 | Postupack et al. |
| 2010/0092765 A1* | 4/2010 | Hager .............. B82Y 30/00 428/331 |
| 2011/0079048 A1 | 4/2011 | Shelestak et al. |
| 2011/0226786 A1 | 9/2011 | Remington, Jr. et al. |
| 2011/0250346 A1 | 10/2011 | Remington, Jr. et al. |
| 2011/0250442 A1 | 10/2011 | Castro et al. |
| 2011/0289971 A1 | 12/2011 | Brown et al. |

FOREIGN PATENT DOCUMENTS

| | | |
|---|---|---|
| JP | 55056042 A | 4/1980 |
| JP | 57129845 A | 8/1982 |
| JP | 58145642 A | 8/1983 |
| JP | 6191897 A | 7/1994 |
| JP | 2002234754 A | 8/2002 |

* cited by examiner

STRENGTHENING GLASS CONTAINERS

The present disclosure is directed to glass containers, and coating processes for glass containers including methods and materials for coating glass containers (e.g., glass bottles and jars).

BACKGROUND AND SUMMARY OF THE DISCLOSURE

Various processes have been developed to apply coatings to glass containers for different purposes, including glass strengthening for damage prevention and fragment retention. For example, U.S. Pat. No. 3,522,075 discloses a process for coating a glass container in which the glass container is formed, coated with a layer of metal oxide such as tin oxide, cooled through a lehr, and then coated with an organopolysiloxane resin-based material over the metal oxide layer. In another example, U.S. Pat. No. 3,853,673 discloses a method of strengthening a glass article by, for example, applying to a surface of the article a clear solution of a soluble, further hydrolyzable metallosiloxane, and maintaining the glass article at an elevated temperature sufficiently high to convert the metallosiloxane to a heat-treated polymetallosiloxane gel structure. In a further example, U.S. Pat. No. 3,912,100 discloses a method of making a glass container by heating the glass container and applying a polyurethane powder spray to the glass container.

A general object of the present disclosure, in accordance with one aspect of the disclosure, is to provide an improved method of increasing strength of glass containers.

The present disclosure embodies a number of aspects that can be implemented separately from or in combination with each other.

A method of filling surface imperfections in an exterior glass surface of a glass container in accordance with one aspect of the disclosure includes the steps of (a) applying a solution including an amphiphile, a solvent, a catalyst, and water to the exterior glass surface of the glass container, at an application temperature between 5 and 40 degrees Celsius, such that the solution at least partially fills the surface imperfections to provide a room-temperature-curable cold-end coating on the glass container; and then (b) allowing the solution applied in step (a) to cure on the exterior glass surface of the glass container, at a curing temperature between 5 and 40 degrees Celsius.

In accordance with another aspect of the disclosure, there is provided a method of manufacturing including the steps of (a) forming a glass container; (b) annealing the glass container; and then (c) cooling the glass container to not more than 40 degrees Celsius; and then (d) applying to the glass container a solution having a composition including an amphiphile, a solvent, a catalyst, and water, and at an application temperature between 5 and 40 degrees Celsius, to provide a room-temperature-curable cold-end coating on the glass container; and then (e) rinsing the glass container with a liquid including water at a liquid temperature between 5 and 40 degrees Celsius to remove residual solution from the glass container; and then (f) allowing the solution applied in step (d) to cure on the exterior glass surface of the glass container, at a curing temperature between 5 and 40 degrees Celsius.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION OF PREFERRED EMBODIMENTS

Figure 1:
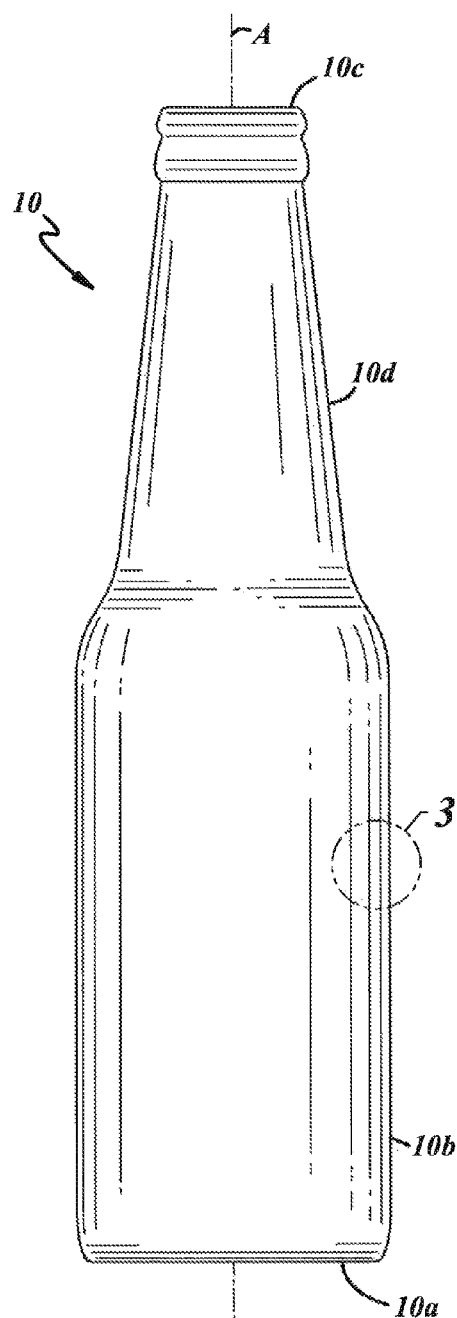
FIG. 1 is an elevational view of a glass container in accordance with an exemplary embodiment of the present disclosure.

FIG. 1 illustrates an exemplary embodiment of a glass container 10 that may be produced in accord with an exemplary embodiment of a manufacturing process presently disclosed hereinbelow. The glass container 10 includes a longitudinal axis A, a base 10a at one axial end of the container 10 that is closed in an axial direction, a body 10b extending in an axial direction from the axially closed base 10a, and a mouth 10c at another axial end of the container 10 opposite of the base 10a. Accordingly, the glass container 10 is hollow. In the illustrated embodiment, the container 10 also includes a neck 10d that may extend axially from the body 10b, may be generally conical in shape, and may terminate in the mouth 10c. However, the container 10 need not include the neck 10d and the mouth 10c may terminate the body 10b, such as in a glass jar embodiment or the like. The body 10b may be of any suitable shape in cross-section transverse to the axis A as long as the body 10b is circumferentially closed.

Figure 2:
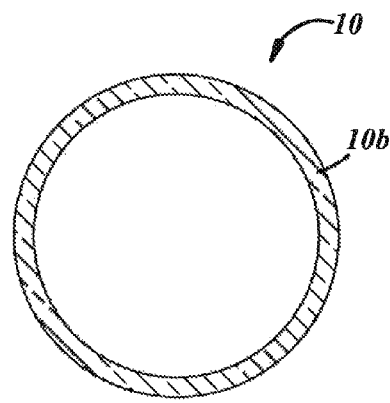
FIG. 2 is a cross-sectional view of the glass container body.

As shown in FIG. 2, for example, the body 10b may be of cylindrical transverse cross-sectional shape that is circumferentially closed. In other embodiments, the body 10b may be generally oval, square, rectangular, or of any other suitable transverse cross-sectional shape. As used herein, the term "circumferentially" applies not only to circular or cylindrical transverse cross-sectional shapes but also applies to any transverse cross-sectional shape.

Figure 3A:
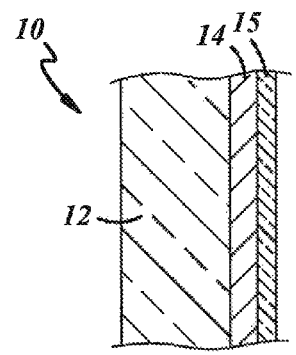
FIG. 3A is an enlarged sectional view of the glass container, taken from circle 3 of FIG. 1.
Figure 3B:
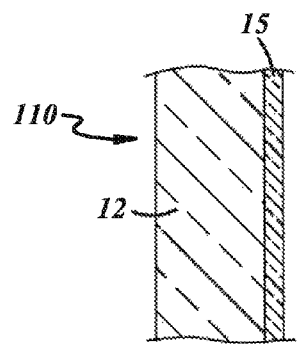
FIG. 3B is an enlarged sectional view of a glass container according to another embodiment.

FIGS. 3A and 3B illustrate that the container 10 includes a glass substrate 12, and further may include a hot-end coating 14 on an exterior glass surface of the container 10 on the substrate 12. The container 10 also includes a cold-end coating 15 on the exterior glass surface of the container 10. The cold-end coating 15 may be disposed over the hot-end coating 14 as shown in FIG. 3A, or directly on the substrate 12 itself as shown in FIG. 3B. Although the coatings 14, 15 are shown as adjacent layers overlying one another sequentially, and one or more of the coatings may penetrate into or even through one or more of the other coatings. Accordingly, the coatings 14, 15 may be fairly described as being applied generally to the glass container 10, regardless of how or to what extent any given coating contacts the other coating and/or the substrate 12. Similarly, when a material is described as being applied to an exterior glass surface of the glass container 10, the material may be applied over one or both of the coatings 14, 15 and/or to the glass substrate 12 itself.

For purposes of the present disclosure, the coating 15 may be applied to the containers as a solution. The coating 15 can increase the strength of glass containers by healing surface anomalies that may be present in the exterior surface of the container 10, and by preventing further creation of surface anomalies. For example, the solution used to form the coating 15 may flow into a crack in glass and be retained therein by room-temperature curing, thereby bridging and blunting a crack tip to increase a burst strength of the container 10.

For example, the solution may be prepared including water, which may be deionized water, a solvent, and an amphiphile, and with or without a catalyst. The viscosity of the solution may be such that it flows well and may be sprayed at room temperatures onto containers and then may be rinsed and room-temperature cured. After curing, the presently disclosed coating 15 may be rigid, scratch resistant, and transparent. Therefore, unlike many conventional surface-sealing coatings, the coating 15 looks and feels like glass. Moreover, the applied coating 15 may be relatively temperature stable and may survive severe temperature extremes, for example, from −20 degrees Celsius to 150 degrees Celsius.

The glass container 10 can be produced in any suitable manner. This typically would involve a "hot end" including one or more melting furnaces, forming machines, and beginning portions of annealing lehrs, and a "cold end" that may include end portions of annealing lehrs and includes inspection equipment and packaging machines. Accordingly, a hot-end coating is a coating applied at the hot end of the glass container manufacturing process, and a cold-end coating is a coating applied at the cold end of the glass container manufacturing process.

After forming a plurality of the glass container 10 with forming machines, but prior to annealing, the glass containers may be hot-end coated in any suitable manner with any suitable hot-end coating materials to produce the hot-end coating 14. For example, the glass containers may be hot-end coated with tin oxide, any other suitable metal oxide, or any other suitable material.

The glass containers then may be annealed in any suitable manner, for example, in an annealing lehr. At an entry, hot end, or upstream portion of the annealing lehr, the temperature therein may be between 750 and 550 degrees Celsius. Through the lehr, the temperature may be brought down gradually to a downstream portion, cool end, or exit of the lehr, for example, to a typical temperature therein of between 130 degrees Celsius and 65 degrees Celsius, or even down to 40 degrees Celsius.

Thereafter, the glass containers are cooled down from their temperature at the exit of the lehr to not more than 40 degrees Celsius. In one example, this step may be passive wherein the containers are allowed to cool down over time. In another example, this step may be active, wherein the containers may be blown with air, or the like.

Next, the solution is applied to the containers in a location downstream of an annealing lehr, as a cold-end coating. In other words, the solution is applied to the containers after annealing the containers. The solution may be applied to the containers in atmospheric pressure and need not be applied in a vacuum environment. The solution is applied to the containers at an application temperature of between 5 and 40 degrees Celsius and all subranges therebetween. For example, the temperature may be between 20 and 30 degrees Celsius, including all subranges therebetween. In a more specific example, the temperature may be between 22 and 28 degrees Celsius, including all subranges therebetween. In an even more specific example, the temperature may be between 24 and 26 degrees Celsius, including all subranges therebetween. The aforementioned temperature is preferably the ambient temperature of the environment in which the solution is applied to the containers, but also may be the temperature of the surfaces of the containers depending on how long the containers are exposed to the environment before coating.

The interior and/or exterior glass surfaces of the container are coated with the silica solution in any suitable manner. In one embodiment, the solution may be sprayed on the glass surfaces in any suitable manner. For example, the solution may be applied to surfaces of the exterior using a spray hood, and/or may be applied to surface of the interior of the containers using a spray gun or the like. In another embodiment, the container may be dipped in the solution in any suitable manner, the solution may be wiped or sprayed on the container, or the like. An ultrasonic atomizer may be used to coat the containers with the solution.

Thereafter, the solution-coated containers are rinsed with a liquid including water, to remove residual solution from the glass container. The liquid may be at a liquid temperature between 5 and 40 degrees Celsius, and may be applied to the containers within 60 seconds after applying the solution to the containers.

Then, the solution remaining on the containers is allowed to cure on the exterior glass surface of the glass container, at an ambient curing temperature between 5 and 40 degrees Celsius, at a relative humidity between 10 and 90% (preferably between 60 and 90%), and for a time between 30 and 180 seconds minutes before the containers are further processed.

The thickness of the resultant coating 15 may range up to 50 nm, preferably about 5 nm (e.g. 4 to 6 mm), and the coating 15 may be monolithic. The coating 15 may vary in thickness to some extent over the glass substrate 14 despite the fact that the various coatings 14, 15 are shown as discrete idealized layers overlying one another sequentially. For instance, variances in the surface morphology of the exterior surface of the glass substrate 12 and/or the hot-end coating 14 may contribute to some natural inconsistency in the thickness of the coating 15 on the nanometer scale. The coating 15 and the hot-end coating 14 also may penetrate each other along their interfaces to form an assimilated transition region of minimal, yet variable, thickness.

The coating 15 is considered "monolithic" if the coating 15 has a generally consistent composition across its thickness and if the entire coating 15 is cured at the same time. A coating 15 that is made by applying and curing two or more layers of the coating composition—with each of the layers being cured separately from one another and in succession—is not considered monolithic as that term is used here. The presence of only one monolithic coating 15 over the exterior surface of the glass substrate 12 is generally sufficient to sufficiently strengthen the glass substrate 12.

Accordingly, no separate cold-end coating, such as polyethylene wax, need be applied in addition to the coating 15, which may replace a conventional cold-end coating. Therefore, the container 10 may be free of or provided without a conventional cold-end coating and, thus, there is no need to use heat-treatment-curable or radiation-curable cold-end coatings. Although the coating 15 may not be placed over polyethylene wax, it can be placed over a tin coating.

The glass containers may be inspected for any suitable characteristics and in any suitable manner. For example, the glass containers may be manually or automatically inspected for cracks, inclusions, surface irregularities, hot end and/or cold-end coating properties, and/or the like.

After inspection, the glass containers may be packaged in any suitable manner.

The manufacturing process may or may not include all of the disclosed steps or be sequentially processed or processed in the particular sequence discussed, and the presently disclosed manufacturing process and coating methods encompass any sequencing, overlap, or parallel processing of such steps.

The solution that is applied to the containers to produce the coating 15 may be purchased and shipped to a glass container manufacturing facility and/or may be prepared on site. Specific examples of solutions are described herein below. In general, however, the solution may be composed of an amphiphile, a solvent, a catalyst, and water.

In one embodiment, the amphiphile consists essentially of RmSiXn wherein the non-polar R is an alkyl, alkyl ether or fluoro-alkyl or alkyl ether group of 8 to 30 carbons, X is hydroxy or alkoxy groups, and M plus N equals 4. In the most preferred arrangement, N equals 3 and M equals 1. The film forming substance can be a mixture wherein R has different values. For example, a substance wherein R is 12 carbons has good thermal stability. It is also possible to use a blended mixture of substances such as one having 30 percent with R being 10, 50% where R is 12 and 20% where R is 14.

In a particular embodiment, the amphiphile includes a silane, for instance, an alkylalkoxysilane. For example, the silane may include an octadecyltriethoxysilane $CH_3(CH_2)_{16}CH_2$—$Si(OCH_2CH_3)_3$. In another example, the silane may include a fluoro based alkoxy silane $CF_3(CF_2)_nCH_2CH_2$—$Si(OCH_2CH_3)_3$, where n=5 to 15. In a further example, the silane may include (TRIDECA-FLUORO-1,1,2,2-TETRAHYDROOCTYL) TRIETHOXYSILANE (e.g., SIT8175.0 from Gelest, Inc. of Morrisville, Pa.). In an additional example, the silane may include (TRIDECAFLUORO-1,1,2,2-TETRAHYDROOCTYL) TRIMETHOXYSILANE (e.g., SIT8176.0 from Gelest). In yet another example, the silane may include a fluoro based propoxy silane $CF_3(CF_2)_n(CH_2)_m$—$OCH_2CH_2CH_2$—$Si(OC_2H_5)_3$, where n=5-9, m=5-11. In still a further example, the silane may include an alkyl B propoxy based alkoxy silane $CH_3(CH_2)_nO(CH_2)_3$—$Si(OC_2H_5)_3$, where n=5-15.

The solvent may include an alcohol, for instance, 2-propanol or normal propanol. The solvent may be a high purity solvent, and may be obtained from Fisher Scientific of Hampton, N.H., or any other suitable source(s). In other embodiments, the solvent may include one or more of the following solvents: denatured ethanol, anhydrous ethanol, methanol, isopropanol, butanol, diethylene glycol, acetones, methylethylketones, tryethyleneglycols, vinylpyrrolidones, toluene, glycerine, phenol, benzyl alcohol, dioxane, alkanes, or chlorinated solvents.

The catalyst may include an acid. For example, the acid may include acetic acid. In other embodiments, the acid may include hydrochloric acid, sulfuric acid, nitric acid, chromic, phosphoric, or the like.

In one example, the amphiphile includes the fluoro based alkoxy silane $CF_3(CF_2)_nCH_2CH$—$Si(OCH_2CH_3)_3$ in a mixture of about 10% where n is 11, about 40-50% where n is 7, and about 40-50% where n is 9. The amphiphile may be provided as a 10% volume-by-volume solution in 2-propanol. In a related example, the deionized water can include 0.01% to 1% volume-by-volume of concentrated (30% HCl) hydrochloric acid as a catalyst. In other related examples, the amphiphile can include the fluoro based alkoxy silane $CF_3(CF_2)_nCH_2CH$—$Si(OCH_2CH_3)_3$ where n is 7, or 9.

In a further embodiment, the solution may consist essentially of the silane, solvent, water, and catalyst materials. In a particular embodiment, the solution may consist essentially of 0.1-1.0% by volume of the amphiphile, 1-10% by volume of solvent in water, 0.01-1% by volume of the catalyst, and the remainder deionized water.

Also, the solution may be modified with other, additional materials, for instance, additives and/or surfactants. Examples may include sodium dodecyl sulfate (SDS) or sodium lauryl sulfate (SLS), cetrimonium bromide, Triton X-100 $(C_{14}H_{22}O(C_2H_4O)_n)$ (n=9-10), cholic acid, and/or octylphenoxypolyethoxyethanol.

In another example, the solution may be doped with a dopant or doping material, for instance, an ultraviolet blocking material Accordingly, materials for providing lubricity, strengthening, and/or ultraviolet blocking properties may be applied in only one step. Accordingly, an ultraviolet blocking material and/or a lubricity material need not be applied in a coating step separate from the silica coating step. As used herein, the phrase "ultraviolet blocking" includes reducing ultraviolet transparency and not necessarily resulting in 100% ultraviolet opacity. Accordingly, in this embodiment, the doped solution may include, and may consist essentially of, the silane, solvent, water, acid, and one or more of the doping materials or dopants. In one embodiment, the ultraviolet blocking material may be 0% to 10% of the solution by weight.

The present disclosure may provide one or more advancements in the art. For example, the silica coating can increase glass container strength by better healing of glass surface anomalies. Conventionally, it has been understood that some silica sol-gel materials can be uniformly applied to flat glass at high temperatures and heat-treated to achieve a thin and somewhat brittle coating to increase glass strength to some limited degree. But such processes consume high amounts of energy, take a long time to complete, and increase costs of production. And it was also understood that it was not cost-effective, or was impossible, to uniformly apply the same sol-gel materials in solid and continuous films over exterior surfaces of glass containers to achieve reliable glass strengthening results. Contrary to conventional wisdom, it is now possible and cost-effective to produce glass containers having a monolithic silica coating that is applicable as a cold-end coating, is room-temperature-curable, and provides relatively uniform coverage to achieve a relatively thicker and stronger coating to increase glass strength to a greater degree.

Therefore, the presently disclosed method provides simple but elegant solutions to problems in the art of glass container manufacturing that have long been experienced but apparently unappreciated.

EXAMPLES

FIG. 4A

A set of 50 uncoated samples of float glass of 2" by 2" size and 3.2 mm thickness were cleaned with soap and water. The glass substrates were then wiped by isopropanol and dried well. A crack was formed on each glass piece using a Vickers hardness instrument at 200 gf for 30 seconds. The glass strength of each sample was measured by ring on ring testing using a Shimadzu electromechanical tester.

Another set of 50 glass samples were prepared as described above, except with a coating composed and applied in accordance with the aforementioned disclosure. The coating is known as AB5 available from Nanofilm Corporation of Valley View, Ohio. AB5 is believed to a solution composed of an amphiphile, a solvent, a catalyst, and water in accordance with the present disclosure. The coating was applied to the samples by soft sponge and then cured at room temperature.

Figure 4A:
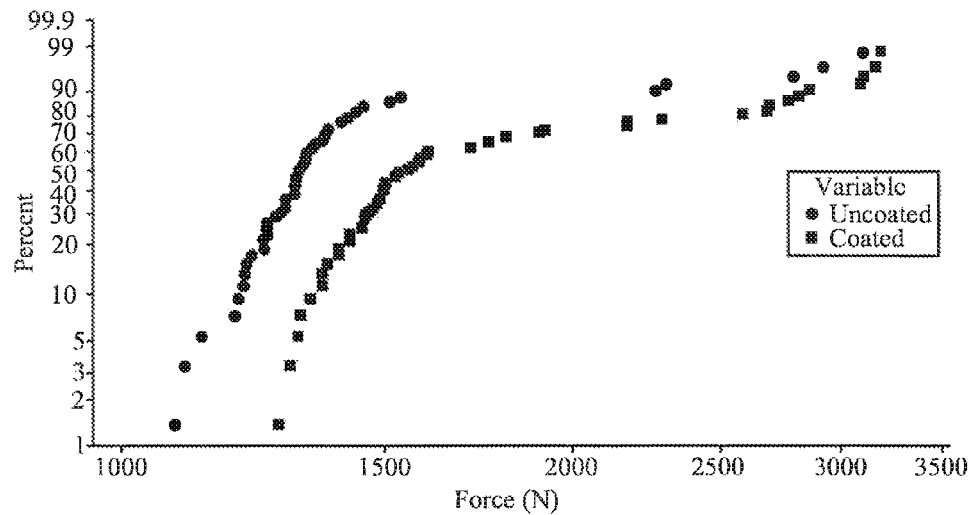
FIG. 4A illustrates Weibull plots of glass strength of uncoated and coated glass samples.

FIG. 4A illustrates that the coated samples provide glass strengthening of 16% and 17% at the 50% and 5% populations.

FIG. 4B

Figure 4B:
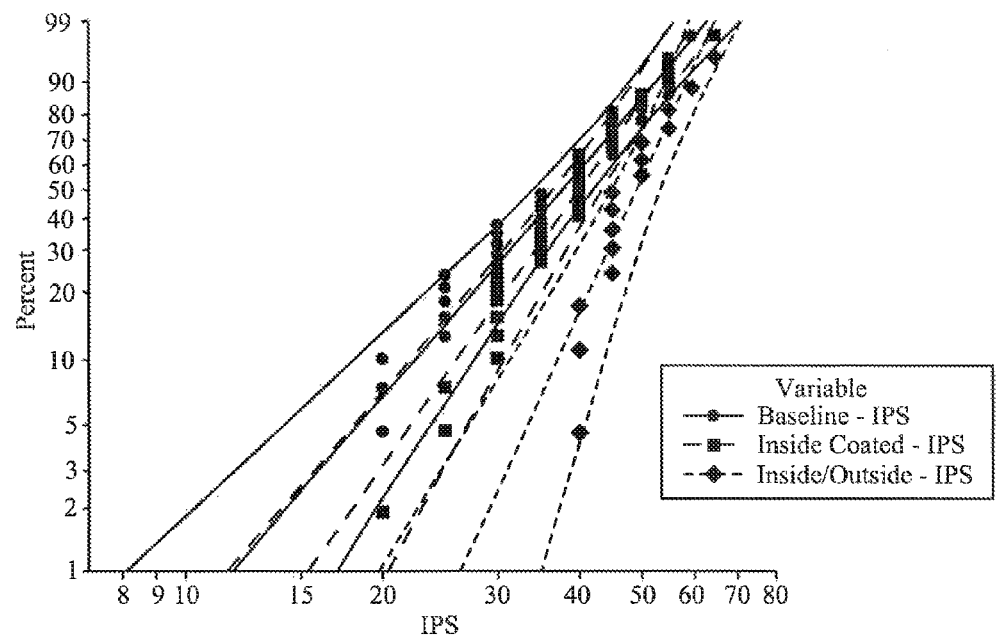
FIG. 4B illustrates Weibull plots of impact strength of baseline and coated glass containers.

A first set of 30 uncoated samples of glass containers were cleaned with soap and water. Impact testing of each container was measured by an Agr brand impact tester available Agr International, Inc. of Butler, Pa. The impact tester provides a means to apply a repeatable impact force to a defined area of the containers for the measurement of impact resistance in inches per second (IPS). The tester can be used with glass to evaluate impact associated with bottle design. FIG. 4B illustrates that the uncoated samples have an impact strength of about 37 at 50% confidence.

A second set of 30 glass containers were prepared as described above, except with the AB5 coating composed and applied to the insides of the containers in accordance with the aforementioned disclosure. The coating was applied to the samples by spraying and then cured at room temperature, and impact testing was carried out. FIG. 4B illustrates that the uncoated samples have an impact strength of about 40 at 50% confidence. Accordingly, providing the glass containers with an inside coating results in about a 14% improvement in impact strength over uncoated containers.

A third set of 30 glass containers were prepared as described above, except with the AB5 coating composed and applied to the insides of the containers in accordance with the aforementioned disclosure. The coating was applied to the samples by spraying and then cured at room temperature, and impact testing was carried out. FIG. 4B illustrates that the uncoated samples have an impact strength of about 49 at 50% confidence. Accordingly, providing the glass containers with an inside and an outside coating results in about a 32% improvement in impact strength over uncoated containers, and about a 23% improvement in impact strength over containers having inside coatings only.

There thus has been disclosed methods of coating glass containers and methods of manufacturing glass containers that at least partially satisfy one or more of the objects and aims previously set forth. The disclosure has been presented in conjunction with several exemplary embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A method of filling surface imperfections in an exterior glass surface of a glass container that includes the steps of:
   (a) applying a solution including an amphiphile, a solvent, a catalyst, and water to the exterior glass surface of the glass container, at an application temperature between 5 and 40 degrees Celsius, such that the solution at least partially fills the surface imperfections to provide a room-temperature-curable cold-end coating on the glass container; and then
   (b) allowing the solution applied in step (a) to cure on the exterior glass surface of the glass container, at a curing temperature between 5 and 40 degrees Celsius, wherein step (b) is carried out at a relative humidity between 60 and 90% and for a time between 30 and 180 seconds before further processing the glass container.

2. The method set forth in claim 1 wherein, before step (b) and directly after step (a), the glass container is rinsed with a liquid, including water, at a liquid temperature between 5 and 40 degrees Celsius, to remove residual solution from the glass container.

3. The method set forth in claim 2 wherein the rinsing step is carried out within 60 seconds after completing step (a).

4. The method set forth in claim 1 wherein step (a) is carried out at atmospheric pressure, and does not require application in a vacuum.

5. The method set forth in claim 1 wherein the amphiphile includes a silane.

6. The method set forth in claim 1 wherein the amphiphile includes at least one of alkylalkoxysilane or octadecyltriethoxysilane.

7. The method set forth in claim 1 wherein the amphiphile includes at least one of a fluoro based alkoxy silane, a propoxy based alkoxy silane, or an alkyl B propoxy based alkoxy silane.

8. The method set forth in claim 1 wherein the application temperature is between 20 and 30 degrees Celsius.

9. The method set forth in claim 1 wherein the application temperature is between 22 and 28 degrees Celsius.

10. The method set forth in claim 1 wherein the application temperature is between 24 and 26 degrees Celsius.

11. A method of manufacturing that includes the steps of:
    (a) forming a glass container;
    (b) annealing the glass container;
    (c) cooling the glass container to not more than 40 degrees Celsius;
    (d) applying to the glass container a solution having a composition including an amphiphile, a solvent, a catalyst, and water, and at an application temperature between 5 and 40 degrees Celsius, to provide a room-temperature-curable cold-end coating on the glass container;
    (e) rinsing the glass container with a liquid including water at a liquid temperature between 5 and 40 degrees Celsius to remove residual solution from the glass container; and
    (f) allowing the solution applied in step (d) to cure on the exterior glass surface of the glass container, at a curing temperature between 5 and 40 degrees Celsius, wherein step (f) is carried out at a relative humidity between 60 and 90% and for a time between 30 and 180 seconds before further processing the glass container.

12. The method set forth in claim 11 also including, prior to step (b), applying a hot-end coating to the exterior glass surface of the glass container, but not applying a cold-end coating to the exterior glass surface of the glass container other than the coating formed by steps d through f.

13. The method set forth in claim 11 wherein the amphiphile includes at least one of alkylalkoxysilane or octadecyltriethoxysilane.

14. The method set forth in claim 11 wherein the amphiphile includes at least one of a fluoro based alkoxy silane, a propoxy based alkoxy silane, or an alkyl B propoxy based alkoxy silane.

15. The method set forth in claim 11 wherein the application temperature is between 16 and 30 degrees Celsius.

16. The method set forth in claim 11 wherein the application temperature is between 22 and 28 degrees Celsius.

17. The method set forth in claim 11 wherein the application temperature is between 24 and 26 degrees Celsius.

18. A method of manufacturing that includes the steps of:
    (a) forming a glass container;
    (b) annealing the glass container;

(c) cooling the glass container to not more than 40 degrees Celsius;

(d) applying to the glass container a solution having a composition including an amphiphile, a solvent, a catalyst, and water, and at an application temperature between 5 and 40 degrees Celsius, to provide a room-temperature-curable cold-end coating on the glass container;

(e) rinsing the glass container with a liquid including water at a liquid temperature between 5 and 40 degrees Celsius to remove residual solution from the glass container, wherein step (e) is carried out within 60 seconds after completing step (d); and (f) allowing the solution applied in step (d) to cure on the exterior glass surface of the glass container, at a curing temperature between 5 and 40 degrees Celsius, wherein step (f) is carried out at a relative humidity between 60 and 90%, and for a time between 30 and 180 seconds before further processing the glass container.

* * * * *